United States Patent

Sorensen et al.

[11] Patent Number: 5,846,433
[45] Date of Patent: Dec. 8, 1998

[54] DEWATERING OF SUSPENSIONS

[75] Inventors: Jens Sorensen, Norrahammar, Sweden; John Rodney Field, West Yorkshire, United Kingdom

[73] Assignees: Allied Colloids Limited, West Yorkshire, United Kingdom; AB CDM, Gothenburg, Sweden

[21] Appl. No.: 765,040
[22] PCT Filed: Jun. 8, 1995
[86] PCT No.: PCT/GB95/01333
§ 371 Date: Apr. 16, 1997
§ 102(e) Date: Apr. 16, 1997
[87] PCT Pub. No.: WO95/33697
PCT Pub. Date: Dec. 14, 1995

[30] Foreign Application Priority Data

Jun. 8, 1994 [GB] United Kingdom .................... 9411444

[51] Int. Cl.$^6$ ....................................................... C02F 11/14
[52] U.S. Cl. ........................ 210/709; 210/727; 210/734; 210/735; 210/928
[58] Field of Search ..................................... 210/609, 709, 210/725, 727, 728, 734, 735, 736, 96.1, 143, 928

[56] References Cited

U.S. PATENT DOCUMENTS

| | | | |
|---|---|---|---|
| 3,594,313 | 7/1971 | Carlson | 210/709 |
| 4,588,508 | 5/1986 | Allenson et al. | 210/708 |
| 5,160,439 | 11/1992 | Dobrez et al. | 210/709 |
| 5,202,016 | 4/1993 | Church et al. | 210/709 |
| 5,213,693 | 5/1993 | McGrow et al. | 210/728 |
| 5,382,356 | 1/1995 | Thogho et al. | 210/709 |
| 5,540,845 | 7/1996 | Blanchard et al. | 210/709 |
| 5,662,805 | 9/1997 | Cameron et al. | 210/709 |

FOREIGN PATENT DOCUMENTS

| | | |
|---|---|---|
| 395 708 B | 2/1993 | Austria . |
| 0 479 616 A1 | 4/1992 | European Pat. Off. . |
| 42 36 756 A1 | 5/1994 | Germany . |
| WO 94/02424 | 2/1994 | WIPO . |
| WO 94/17895 | 8/1994 | WIPO . |

*Primary Examiner*—Peter A. Hruskoci
*Attorney, Agent, or Firm*—Sughrue, Mion, Zinn, Macpeak & Seas, PLLC

[57] ABSTRACT

A suspension is dosed with a coagulant and then with a flocculant and is dewatered to form a thickened sludge or cake and separated liquor, and control of the dewatering performance is improved by adding the flocculant at a predetermined dosage, monitoring the charge in the separated liquor (or monitoring other dewatering parameter of the separated liquor or suspension) and adding coagulant at a dosage selected in response to the monitored charge or other parameter value in order to maintain the value substantially at a preselected optimum value.

14 Claims, No Drawings

DEWATERING OF SUSPENSIONS

This application is a 371 of PCT GB95 01333, filed Jun. 6, 1995.

This invention relates to processes in which a suspension (for instance sewage sludge) is flocculated to form a flocculated suspension which is then dewatered to form a thickened sludge or cake and a separated liquor (filtrate or centrate or supernatant).

It is usually adequate to flocculate the feed suspension by use of a polymeric flocculant alone, prior to the dewatering. However it is also known to treat the suspension with a coagulant, which can be an inorganic coagulant such as alum, or a polymeric coagulant. Polymeric coagulants have a lower molecular weight than flocculants and, usually, a higher charge. Processes in which polymeric coagulant and flocculant are used are relatively uncommon but are known, for instance in U.S. Pat. No. 4,588,508 and EP-A-479616.

It is well known that it is necessary to select the optimum dose of flocculant in order to obtain optimum dewatering, but what constitutes optimum dewatering in any particular process depends upon the objective of that process. For example, in some processes the primary objective is to provide a cake having the highest possible solids content whilst in other processes the objective may be to provide separated liquor having the highest clarity and lowest turbidity. There is usually a conflict between optimising cake solids and optimising clarity, probably because the very fine hydrophilic suspended solids that cause inferior clarity may tend to hold water in the cake if they are trapped in the cake rather than left as turbidity in the separated liquor. Accordingly, the operator has to select an optimum which may be based on optimising cake solids or clarity or a compromise. In many commercial processes some or all of the separated liquor is recycled to an earlier stage in the process, thereby allowing optimisation of cake solids provided the recycled turbidity does not cause an unacceptable gradual deterioration in the process.

The suspension that is being dewatered is likely to be of variable composition and so it is desirable, in theory, to vary the dose of flocculant according to variations in the composition of the suspension in order to hold performance at the chosen optimum. Such variations can be made as a result of observation of the performance of dewatering, for instance changes in the solids content of the cake. However this is a rather slow, inconvenient and inefficient way of controlling the dewatering process. Accordingly various ways are known for observing a dewatering parameter of the feed suspension, the flocculated suspension or the separated liquor and utilising the observed parameter to control the flocculant dosage.

For instance the zeta potential of the suspension is utilised in JP-A-02052100. Minimisation of zeta potential is discussed in Pulp and Paper, August 1977, Volume 51, 9, pages 112 to 115 and controlling a process in response to zeta potential measurement is also discussed in U.S. Pat. No. 3,594,313. Optimising cake solids by adjusting the addition of polymer in response to measurement of charge by streaming current is described in JP-A-04083600. Reduction in the amount of polyvalent metal salt coagulant required for treating water is achieved by monitoring charge in the water in J Inst Water Environment Management 1992, 6(1), pages 1 to 9. Other ways of controlling polyvalent metal coagulant in the treatment of tap water in response to measurement of, for instance, acidity in the tap water are described in JP-A-03284305.

These methods are indirect in that they determine a physical property, but it is also known to control the process by monitoring the actual dewatering performance of the suspension. Control by monitoring the filterability of the suspension is described in WO94/17895 and control by monitoring the turbidity of the separated liquor is described in WO94/17394. Control of the amount of alum in a process which also uses high molecular weight anionic polymer for the treatment of water is made by measurement of the ortho-phosphorous concentration of the final effluent in J Water Pollut Control Fed (1975), 47 (12) 2830 to 2833.

Many of these processes are aimed at controlling the clarification of liquid having relatively low suspended solids. A much more demanding task is the optimised control of processes of dewatering sludges, for instance having at least 1% suspended solids.

Although the known methods can provide a useful degree of control, it is often difficult to achieve sufficient sensitivity by these methods, especially in the dewatering of sludges. Accordingly performance may vary from what has been selected by the operator as being appropriate in terms of efficiency of the process and which can therefore be regarded as the preselected optimum (irrespective of whether or not another operator would have selected the same optimum). This variation from the preselected optimum occurs even though the parameter is being monitored and utilised in an attempt at maintaining dosage at a value that should give the preselected optimum. In particular, although the process may be established at a preselected optimum either by observation of the process or by use of one of these parameters, the nature of the suspension is likely to change from time to time with the result that the process will deviate from the preselected optimum process conditions.

It would therefore be desirable to provide a simple and reliable way of observing when the process conditions are deviating from preselected optimum process conditions, and of restoring the process conditions to the preselected optimum. In particular it would be desirable to be able to control the dewatering of sludges with more sensitivity, and in particular thereby to obtain an overall improvement in cake solids or quality of separated liquor or both, and it would be desirable to achieve these good results using reduced consumption of treatment chemicals.

The invention provides a process for dewatering a feed suspension and comprises flocculating the feed suspension by adding a predetermined dose of polymeric flocculant having intrinsic viscosity of at least 4 dl/g and dewatering the flocculated suspension to produce a cake and a separated liquor. In the invention a parameter of the flocculated suspension or the separated liquor is monitored and an ionic coagulant is added to the feed suspension, before the flocculent, in an amount sufficient to maintain the parameter substantially at a predetermined value during prolonged operation of the process.

A preferred process according to the invention of dewatering a feed suspension comprises flocculating the suspension by dosing into the suspension a coagulant selected from a water soluble ionic polymer having intrinsic viscosity (IV) at most 3 dl/g and a water soluble salt of a polyvalent metal and then dosing into the suspension a water soluble polymeric flocculant having IV at least 4 dl/g and dewatering the flocculated suspension to give a thickened sludge or cake and a separated liquor, and in which the flocculant is added at a predetermined dosage, and the value of a dewatering parameter of the separated liquor or the flocculated suspension is monitored, and the coagulant is added at a dosage selected in response to the monitored value in order to maintain the monitored value substantially at a preselected optimum value.

Better control of the process is generally achieved when the monitoring of the parameter is conducted later in the process rather than sooner and so generally it is preferred that the monitoring of the parameter is conducted on the suspension after flocculation, but best results are achieved when the monitoring of the parameter is conducted on the separated liquor.

The process can be conducted on a variety of feed suspensions but is particularly satisfactory, and is best conducted on, the dewatering of a sewage sludge, that is to say a sludge having organic suspended solids, optionally containing some inorganic solids, in an amount of generally at least about 1% and typically up to 5 or 6% or higher, dry weight based upon total sludge. Accordingly the process can be conducted on municipal or industrial sewage sludge.

The dewatering process can involve sedimentation but generally is a mechanical dewatering process, for instance filtration or other thickening process which will produce a thickened sludge. However the process is primarily intended for control of mechanical dewatering processes which produce cake, such as centrifugation, belt pressing or filter pressing.

The invention facilitates the maintenance of the efficiency of the dewatering process at conditions that are close to those which have been preselected as being the optimum for the process. Thus, once the operator has selected conditions which the operator judges to be as good as can reasonably be obtained with the equipment and flocculant available to the operator (i.e., the preselected optimum) it is then possible to maintain the performance of the process close to this preselected optimum by varying the amount of coagulant so as to maintain the monitored value substantially constant. Thus it is possible to maintain the solids content of the cake at or close to the value which is the preselected optimum for that process. Alternatively, it is possible to maintain the suspended solids content of the separated liquor at a value close to the preselected optimum for that process.

One of several dewatering parameters can be selected from monitoring the process and as being indicative of performance. Thus the value of the chosen parameter can be observed at the time when the process is being conducted at the preselected optimum, and variation of the monitored value from that original optimum value is an indication that the operation of the process has varied, probably due to changes in the suspension, with the result that the dewatering will no longer be operating under the preselected optimum conditions. The amount of coagulant is thus varied so as to bring the measured value back to the value it had when the process was operating under the preselected optimum conditions, and this allows restoration of the dewatering process to these conditions.

The invention allows more sensitive control of the process than has been obtained in prior methods involving monitoring a parameter and adjusting the addition of flocculant or the dewatering conditions. This better control is achieved because the control is achieved by modifying the charge on the suspended solids of the feed suspension by the coagulant, prior to the flocculation stage, so as to render the charge optimum for that flocculation stage. This is in contrast to conventional processes where the control generally merely varies the amount of flocculant.

For instance variations in the feed suspension are frequently manifested by variations in the charge on the suspended particles in that suspension. The polymeric flocculent functions primarily by a bridging mechanism and it may be difficult to compensate for these variations in charge merely by varying the amount of flocculant. For instance if enough flocculant is added to maintain the charge constant, in some instances this may incur the risk of overdosing of the flocculant.

In the invention, the variations in charge are being minimised and substantially eliminated by varying the amount of coagulant that is added, with the result that the suspension that is to be flocculated by the predetermined dose of polymeric flocculant is then more consistent and, in particular, the charge on the particles is more consistent. If the predetermined dose of flocculant has been selected at a value that gives preselected optimum dewatering when the suspension has a particular charge or other parameter, and if the coagulant is added in an amount that varies so as to maintain this charge or other parameter substantially constant, the process will tend to be maintained at substantially consistent conditions that are close to those that were originally selected for optimum dewatering.

In preferred processes of the invention, the flocculant is added at a substantially constant dosage during the period, the dewatering parameter (generally of the separated liquor but sometimes of the flocculated suspension) is monitored during this period and the coagulant is added at a dosage which is selected in response to the monitored value in order to maintain the monitored value substantially at a preselected optimum value during that period. The period may last only a short while, for instance an hour or so, but more usually it lasts for several hours, e.g., half a day to a day, or several days or longer.

The invention is particularly of value when the feed suspension varies during the period and the dewatering conditions remain substantially constant during the period. For instance the flocculant may be added at a subtantially constant amount per hour and the rate of flow of suspension may vary or, more usually, the flocculant may be added at a substantially constant dosage per unit volume of suspension and the content of the suspension (either solids content or chemical content) may vary. In some processes the flocculant may be added at a substantially constant dosage with respect to the solids content of the suspension, but the chemical content may vary.

Thus the process of the invention is usually applied to the dewatering of a feed suspension that is of variable composition while the predetermined dose of polymeric flocculant and the dewatering conditions are preferably substantially constant. Thus in the invention the amount of coagulant that is added is varied in response to variations in the feed suspension and the amount of polymeric floccculent is generally maintained at a constant value.

Although the process is often conducted using a single constant value for the dose of polymeric flocculant, in some instances it is desirable to be able to select the polymeric flocculant from a limited range of constant values. For instance if there are gross changes in the characteristics of the feed suspension, it may be convenient to select, for any one period, a predetermined constant dose for the polymeric flocculant and to vary the coagulant to give optimum results with that dose. When the characteristics of the suspension alter significantly, it may then be desirable to use a different predetermined constant dose of the flocculant for the subsequent period and to vary the amount of coagulant to give optimum results with that dose during that period.

The parameter that is monitored can be any of those that have previously been proposed for monitoring or facilitating the selection of the dosage of flocculant. The monitoring maybe occasional or continuous. The parameter can be a parameter which is a direct indicator of the dewaterability of the suspension such as the filterability of the suspension or the turbidity of separated liquor obtained in the process or obtained under standard conditions from the flocculated suspension.

When the parameter is the filterability of the suspension, the filterability is recorded on the feed suspension to which the flocculant has been added. By referring to the filterability of the flocculated suspension, we mean the filtration characteristics of the suspension as indicated in a filtration test. For instance a sample of the suspension may be removed and filtered through a Buchner filter or other suitable laboratory filter under predetermined conditions and the rate of filtration, the suspended solids in the separated liquor, or the solids content of the cake after predetermined filtration conditions may be recorded. Preferably, however, the filterability is determined continuously by filtration through a membrane as in WO94/17895.

When the parameter is the turbidity of the separated liquor, this can be determined in conventional manner by optical measurements within the separated liquor or by removing a sample and measuring its turbidity in a laboratory cell. Preferably, however, turbidity is measured by the technique described in WO94/17394.

It is generally preferred to use a parameter which can be analysed by routine physical or chemical analytical procedures and which is an indirect indicator of the dewatering performance. For instance the parameter can be the conductivity of the separated liquor obtained in the process. The preferred parameter which is monitored is the charge in the separated liquor which is obtained in the process. The charge in the separated liquor is generally the particle charge in the separated liquor as measured by the streaming current or streaming induced potential of the separated liquor. Various streaming current detectors are known and can be used for determining the streaming current, or streaming induced potential, of the separated liquor.

The preselected optimum value of the particle charge in the separated liquor as measured by the streaming current or streaming induced potential of the separated liquor is often a zero charge or a charge close to zero. That is to say, the charge is often a zero charge or a charge close to zero when the process is operating under optimum performance conditions. If the preselected optimum value is not zero or close to zero, it may be meaningful to rely upon a measured positive or negative value, but generally it is more meaningful to rely upon the amount of a preselected cationic or anionic titrant that is required to restore the charge to zero. For instance when the measured charge indicates that cationic material is required to generate a zero measured charge, a preselected solution of polydiallyl dimethyl ammonium chloride may be titrated into the particle charge detector during the measurement and the amount of this solution that is required to give a zero charge reading can be regarded as the parameter that should be kept constant.

Instead of recording the charge directly or by titration as indicated, a parameter such as filterablity or turbidity can be recorded, but it may then be found that the filterability or turbidity value that corresponds to optimum dewatering of the suspension does in fact correspond to this zero or near zero charge.

It is not essential that the parameter should be maintained exactly at a predetermined value (for instance a zero charge) and some variation can be permitted while still obtaining the benefits of the invention. However if the parameter varies significantly from the predetermined value that gives optimum results, less satisfactory results will be obtained. Naturally if optimum conditions can, in any particular process, be obtained across a range of charge or other parameter values then the coagulant can be added at a dosage to maintain the monitored value substantially within this range.

Although the optimum value is, in many instances, close to zero or at zero there can be processes in which it is represented by a significant positive charge or by a significant negative charge. This is because the optimum value depends upon numerous inter-relating factors such as the choice of coagulant, the choice of flocculent and its amount, the properties of the suspension, the dewatering conditions, and the dewatering performance which is being optimised. When, as is preferred, the dosage of flocculant and the dewatering conditions are held substantially constant, variations in the monitored charge or other parameter (at constant coagulant) are then confined to variations in the suspension that is to be dewatered. By saying that the dewatering conditions are kept substantially constant, we mean that the dewatering conditions are kept sufficiently constant that they do not, by themselves, cause any significant change in the parameter that is being measured. For instance when the parameter is the charge in the separated liquor, significant variations in the shear applied during the dewatering may influence this charge. Accordingly, in order that changes in the charge are due solely to variations in the suspension, it is desirable to maintain the shear conditions substantially constant.

The measurement of the parameter may be conducted in line (including in a by-pass) as the flocculated suspension flows towards the dewatering apparatus or as the separated liquor flows away from the dewatering apparatus. Thus the process may be conducted using control apparatus in which the charge or other parameter is determined automatically and the measured value (or the extent to which this value deviates from a predetermined optimum value) is used to control automatically the dosing of the coagulant into the supsension.

The coagulant should be chosen, having regard to the nature of the suspension and the polymeric flocculant, such that altering the dose of coagulant can have a beneficial effect on the dewatering performance of the flocculated suspension. Usually the coagulant and the flocculant are both ionic and are preferably coionic. Thus when the suspension has characteristics such that it can suitably be flocculated using an anionic polymeric flocculant, the coagulant is usually anionic. Suspensions that can be flocculated with an anionic flocculant include various mineral suspensions.

Preferred processes of the invention are conducted using a cationic flocculent. Usually the coagulant also is cationic but in some instances it is desirable for the coagulant to be anionic. Organic sludges such as municipal sewage sludge or paper-mill effluent sludge are usually best treated with a cationic flocculant.

The cationic coagulant can be inorganic, for instance being a water soluble salt of a polyvalent metal. Typical inorganic coagulants include alum, aluminium chloride, polyaluminium chloride, ferric chloride and ferric sulphate.

In preferred processes the coagulant which is added in response to monitoring of the dewatering parameter is a polymeric coagulant, and often this is the only coagulant which is used in the process.

Suitable polymeric coagulants have intrinsic viscosity below 3, and often below 2, dl/g. They usually have a high charge density, with at least 70 or 80 mole percent and usually at least 90 mole percent of the recurring units being ionic, generally cationic. The ionic charge (measured in meq/g) of the preferred coagulants (calculated on the monomers used to form the polymer) is usually at least 3 meq/g and preferably at least 4 meq/g.

Preferred coagulant polymers are homopolymers of dialkylaminoalkyl (meth) acrylate generally as quaternary salt or acid addition salt (especially dimethylaminoethyl methacrylate) and copolymers of this with a minor amount (usually below 30 mole percent and preferably below 10 mole percent) acrylamide (or other non-ionic monomer), homopolymers of dialkylaminoalkyl (meth) -acrylamide quaternary salt or acid addition salt or diallyl dimethyl ammonium chloride and copolymers of these with small amounts (generally below 30 mole percent and preferably below 10 mole percent) acrylamide, polyethylene imines, polyamines, epichlorhydrin diamine condensation products, dicyandiamide polymers and other conventional low molecular weight cationic coagulant polymers. Natural products such as chitosan and modified starch can be used.

The intrinsic viscosity of such polymers can be as low as 1 dl/g or below. Expressed as molecular weight measured by gel permeation chromatography, it is usually below 1 million, preferably below 500,000 and often below 300,000. Generally it is above 50,000.

Intrinsic viscosity is determined by suspended level viscometer in 1M sodium chloride at 25° C. buffered to pH7.

The polymeric flocculent has high molecular weight in order that it can act as a bridging flocculant. Generally it has intrinsic viscosity of at least 6 dl/g. When the flocculent is cationic, intrinsic viscosity is generally in the range 6 to 15 dl/g or higher. When the flocculant is anionic, intrinsic viscosity is generally in the range 10 to 30 dl/g or higher. The molecular weight of the flocculant is usually above 5 million, and often above 10 million.

The flocculant polymer generally has a lower ionic charge than the coagulant polymer. For instance the ionic charge of the coagulant polymer is usually at least 1.5 times, and frequently at least 3 times the ionic charge of the flocculant polymer (measured in meq/g) when the polymer is cationic. The ionic charge of the flocculant polymer is frequently in the range 0.1 to 2 meq/g (measured on the monomers used to form the polymer).

The flocculent polymer, when cationic, is usually a copolymer of 2.5 to 65 mole percent cationic monomer with 35 to 97.5 mole percent acrylamide or other non-ionic monomer. The preferred cationic monomers are dialkylaminoalkyl (meth) -acrylates or -acrylamides as acid addition or quaternary ammonium salts. Other cationic or non-ionic water soluble ethylenically unsaturated monomers may be used.

When the flocculant polymer is anionic, it is typically a copolymer of acrylamide (or other non-ionic monomer) with sodium acrylate or other ethylenically unsaturated, water soluble, carboxylic monomer.

The polymers used in the invention are usually formed of a water soluble monomer or monomer blend and are themselves water soluble. However flocculant polymer introduced in the form of small particles (below 10 μm) may be used while part at least of it remains in particulate form, for instance as a result of being cross linked. Suitable polymers of this type are described in more detail in EP-B-202780.

The addition of the coagulant and of the flocculant in the suspension may be made in conventional manner. For instance the coagulant may be added as an aqueous solution typically having a coagulant polymer content of 0.2 to 2% while the flocculant may be added as a flocculant solution typically having a flocculant content of 0.03 to 0.5% by weight. The polymer solution is mixed thoroughly into the suspension, in conventional manner.

A particularly valuable process according to the invention is for dewatering sewage sludge and comprises flocculating the sludge by dosing into the feed sludge a water soluble cationic polymeric coagulant having intrinsic viscosity at most 3 dl/g and a cationic charge of at least 3 meq/g and then dosing into the sludge a water soluble cationic polymeric flocculant having IV at least 4 dl/g and a cationic charge which is lower than the charge on the coagulant, and dewatering the flocculated sludge by a centrifuge, filter press or belt press to form a cake and a separated liquor, and in which the flocculant is added at a predetermined substantially constant dosage over a period, the sludge varies during this period, the charge in the separated liquor is monitored during this period and the coagulant is added at a dosage selected in response to the monitored charge in order to maintain the monitored charge substantially at a preselected optimum.

The following are examples of the invention.

EXAMPLE 1

In this example the suspension is sewage sludge, the coagulant is a homopolymer of dimethylaminoethyl methacrylate quaternised with methyl chloride having intrinsic viscosity of about 1 dl/g and the flocculant is a copolymer of acrylamide with 21 mole percent dimethylaminoethyl acrylate quaternised with methyl chloride having intrinsic viscosity about 8 dl/g. The coagulant is added as a 1% aqueous solution and the flocculant as a 0.1% aqueous solution.

Different doses of the coagulant were added to the sludge and mixing was achieved by pouring from one beaker to another several times. 100 ppm flocculant was then added, and mixed in similar manner. The sludge was then transferred to a Buchner funnel and filtered on a filter paper which absorbed and retained 6 ml of separated liquor. The volume of separated liquor collected in 5 minutes was determined and expressed as a percentage of the total water content of the sludge. The charge on the particles in the separated liquor was determined using a Mutek particle charge detector. When the recorded charge is not zero, the anionic demand of the separated liquor is estimated, but the cationic demand is established by titration with 0.016% aqueous poly DADMAC solution. Thus, in the following results, the positive values for charge are the number of mls of that solution required to give zero charge in the detector while negative values indicate an estimated anionic demand.

The results are set out in Table 1.

TABLE 1

| Coagulant Dose | 0 | 0.01 | 1 | 2 |
|---|---|---|---|---|
| Charge | 6.5 | 5 | −0.5 | −1 |
| Separated Liquor | 68 | 69 | 68 | 72 |

This shows that in this series of tests the optimum performance is achieved when the charge is −1. Accordingly, to maintain this preselected optimum performance it is necessary to compensate for any changes in the suspension by varying the dosage of coagulant to maintain this charge.

EXAMPLE 2

The process of Example 1 is repeated but using a flocculant polymer which is a copolymer of 60 mole percent dimethylaminoethyl acrylate quaternised with methyl chloride and 40 mole percent acrylamide having IV about 7 dl/g. The results are shown in Table 2.

TABLE 2

| Coagulant Dose | 1 | 1.2 | 1.3 | 1.4 | 1.5 | 2 |
|---|---|---|---|---|---|---|
| Charge | 1 | −0.1 | −0.2 | −0.5 | −0.7 | −1.0 |
| Separated Liquor | 70 | 81 | 79 | 77 | 74 | 73 |

This shows that the optimum performance occurs with a charge of around zero or slightly negative, and so the amount of coagulant should be varied in response to changes in the suspension in order to maintain this zero or slightly negative charge in the separated liquor.

EXAMPLE 3

The same general process as described in Example 1 was repeated using the same flocculant as Example 2 and, as coagulant, a low molecular weight Mannich polymer, namely a polymer of dimethylaminomethyl acrylamide quaternised with methyl chloride. The results are shown in Table 3.

TABLE 3

| Coagulant Dose | 0.8 | 1.0 | 1.05 | 1.1 | 1.15 | 1.4 |
|---|---|---|---|---|---|---|
| Charge | 1.2 | 1.25 | 1.0 | 0.7 | 0.6 | 0.2 |
| Separated Liquor | 72.3 | 73.7 | 73.4 | 73.0 | 76.2 | 70.3 |

This shows that this process is best conducted when the charge is around 0.6 (i.e., 0.6 ml of the aqueous poly DADMAC solution is required to give a zero charge).

EXAMPLE 4

At this plant dewatering is by centrifugation. The sludge being dewatered is a mixed Digested Chemical Primary Activated Sludge with the secondary component being made up of sludges from predenitrification, nitrification and final denitrification.

Laboratory tests were carried out to compare the effectiveness of various coagulants and flocculants and combinations of coagulant and flocculent treatments as dewatering aids for the sludge. A combination of the homopolymer of Example 1 as coagulant and a copolymer of acrylamide with 13.6 mole percent dimethylaminoethyl acrylate quaternised with methyl chloride, having intrinsic viscosity about 12 dl/g as flocculant, were selected as the treatment for further examination. The flocculant was added at a dose of 100 ppm whilst the coagulant dose was varied. 100 ml portions of sludge treated in this way were subjected to buchner funnel filtration when the following results were obtained on the filtrate.

| Coagulant Dose (ppm) | 150 | 180 | 210 |
|---|---|---|---|
| Charge (ml DADMAC soln) | 1.485 | 0.735 | 0 |
| Separated Liquor (%) | 69.3 | 71.6 | 73.7 |

The treatment involving pre-addition of 210 ppm of coagulant followed by 100 ppm of copolymer was used to aid the dewatering of sludge on the full scale centrifuge plant. The coagulant was added just after the sludge pump as a 0.375% solution whilst the flocculent was added just before the centrifuge as a 0.25% solution.

In the early stages of the trial it was established that the flocculant dose could be reduced to 50 ppm and, over the next three months, the coagulant dose was reduced progressively from 210 to 135 ppm whilst maintaining the zero charge requirement. Results are given below which indicate the centrate quality in terms of Chemical Oxygen Demand (COD), Total Phosphorous (P-tot) and Suspended Solids (S.S). These are given as the average for a period of three months whilst the previously optimised flocculant alone treatment, involving addition of 180 ppm of the copolymer, was in use and for a similar period with the charge controlled treatments.

|  | Previous Treatment | Charge Controlled Treatment |
|---|---|---|
| COD ppm | 1500 | 450 |
| P-tot | 25.0 | 3.8 |
| S.S. | 1600 | 360 |

These results show the improved dewatering performance that can be obtained by the invention.

EXAMPLE 5

Digested Primary Activated sludge was being dewatered on 3 filter belt presses using the copolymer of Example 1 as flocculant at a dose of 150 ppm. The results were judged to be optimum.

On one of the belt presses treatment involving the use of the flocculent and coagulant of Example 1 was introduced. At a dose of 150 ppm flocculant and 75 ppm coagulant, with coagulant being introduced on the pressure side of the sludge pump and flocculant just before the machine, the sludge cationic demand was found to be 0.

Having set up the machines to run in this way COD, P-tot and S.S. were measured on the filtrates with total solids being measured on the sludge cakes.

The performance of the machines was monitored for a period of approximately two months when 21 complete sets of results were obtained. The averages for these are set out in the table below.

|  | Flocculant | Coagulant/ Flocculant |
|---|---|---|
| Filtrate COD (ppm) | 887 | 780 |
| Filtrate P-tot (ppm) | 6.09 | 3.49 |
| Filtrate SS (ppm) | 353 | 225 |
| Cake TS (%) | 29.97 | 30.50 |

It can be seen that the dual treatment originally set to run at zero charge produced a considerable improvement in filtrate quality whilst at the same time providing a slight improvement in cake solids.

EXAMPLE 6

Digested Primary Activated sludge was being thickened in two thickeners being run in parallel so that each received part of the same sludge production.

During the course of a 9 day trial sludge being fed to one thickener was left without treatment at all. For the other the sludge was treated, for the first 7 days, with 22.5 ppm of the homopolyner coagulant of Example 1. During the course of the final three days the sludge being treated with coagulant was treated in addition with 5 ppm of a flocculant copolymer of acrylamide and 1.78 mole % of acrylamideopropyltrimethylammonium chloride as flocculant.

In course of this trial the solid content of the thickened sludge was recorded for the two thickeners as shown in the table below.

| | Sludge Solids | |
|---|---|---|
| Day | Thickener A | Thickener B |
| 1 | 3.8 | 3.5 |
| 2 | 3.9 | 2.9 |
| 3 | 6.7 | 6.0 |
| 4 | 5.9 | 5.9 |
| 5 | 4.7 | 5.6 |
| 6 | 3.1 | 8.5 |
| 7 | 4.7 | 8.0 |

The desired level of sludge solids in this thickening process was circa 8.0%. This was achieved once the coagulant/flocculant treatment in question became effective as can be seen for the last two results. In order to maintain this it was found that the cationic demand would have to be controlled with the coagulant to a level of 0.4 ml of DADMAC.

During the course of this trial it was also observed that improvement in COD and Turbidity of the supernatant resulted from the treatment with the coagulant and coagulant/flocculant. Average values for the 9 day period were as follows.

| | COD (ppm) | Turbidity (NTU) |
|---|---|---|
| Thickener A | 689 | 225 |
| Thickener B | 570 | 140 |

Also the throughput of thickener B was 35% greater than thickener A.

In a trial subsequently carried out, over a five day period, the above performance was maintained in the coagulant/flocculant treated thickener.

EXAMPLE 7

A series of tests were carried out, in accordance with the process of Example 1, on a chemical sludge generated in course of treating paper mill effluent. This involved the examination of two coagulant polymers. The first (coagulant 1) was the homopolymer of Example 1 whilst the second (coagulant 2) was an aminomethylated polyacrylamide which had been quaternised with methyl chloride.

These were examined in combination with a flocculant which had been prepared as a copolymer of acrylamide and 35.5 mole percent dimethylaminoethylacrylate quaternised with methyl chloride. The following results were obtained.

| Treatment | Charge (ml) | Separated Liquor (%) |
|---|---|---|
| Coagulant 1 75 ppm | 0.30 | 38.0 |
| Flocculant 30 ppm | | |
| Coagulant 1 90 ppm | 0.20 | 37.0 |
| Flocculant 20 ppm | | |
| Coagulant 1 105 ppm | 0.18 | 36.5 |
| Flocculant 15 ppm | | |
| Coagulant 1 105 ppm | 0.20 | 38.0 |
| Flocculant 30 ppm | | |
| Coagulant 2 140 ppm | 0.34 | 39.5 |
| Flocculant 30 ppm | | |
| Coagulant 2 260 ppm | A | 33.0 |
| Flocculant 90 ppm | | |

Note: "A" denotes anionic demand.

From the above set of results it can be seen that the percentage of filtrate produced was broadly in line with cationic demand. The highest filtration rate in this series corresponds to a cationic demand of 0.34. This would be maintained in any situation by fixing the copolymer dose and varying that of the coagulant.

EXAMPLE 8

Biological solids from a paper mill effluent were settled following treatment with 5–10 ppm ferric chloride and 1 ppm of a high molecular weight polymer. The sludge so formed was found to have a very low charge of −16 millivolts and required 0.6 ml of polyDADMAC to reduce it to zero charge.

The addition of polymer flocculants was required to allow subsequent dewatering of this sludge. In order to do this the 500 ml portions of the flocculated sludge were filtered on a buchner funnel and the time taken to produce 350 ml of filtrate was ascertained.

Addition of 50 ppm of a flocculant copolymer, comprising acrylamide and 38.11 mole % dimethylaminoethyl acrylate quaternised with methyl chloride having intrinsic viscosity about 9 dl/g, to this sludge produced a reading of +52 millivolts in the filtrate. At this anionic demand the optimum filtrate time was 31 seconds.

Addition of a similar copolymer containing 59.47 mole 15% dimethylaminoethyl acrylate produced a similar effect but at a lower dose of 30 ppm when the filtrate time was 24 seconds.

Attempts to reduce the dose of flocculant in order to reduce the anionic demand to zero and improve dewatering merely resulted in a weakening of the floc produced and a greater dewatering time.

It was found that this could be overcome by taking the optimum flocculant dose in each case (30 ppm for the higher and 50 ppm for the lower cationic) and using it in conjunction with pre-addition of 14 ppm of a low molecular weight anionic homopolymer (sodium polyacrylate) which it was found reduced the charge to zero. This provided very much better results of 18 seconds for the 38.11 mole % copolymer and 14 seconds for that having 59.47 mole % of cationic content.

In this case anionic pretreatment followed by the 59.47 mole % flocculant copolymer with control of the charge at zero by varying the anionic dose would seem to represent the most suitable treatment.

EXAMPLE 9

Laboratory tests were carried out on a sample of Digested Primary/Activated sludge in order to extend investigation to the use of turbidity and drainage for determination of the coagulant polymer dosing.

In this case the charge in the sludge filtrate was measured using the Mutek particle charge detector but with the results being expressed in milliequivalents per liter (meq/l), in order to provide a quantitative indication of anionic demand. Also, the drainage volume (ml) after 10 seconds was measured through a plastic mesh and the turbidity of the filtrate resulting from free drainage was recorded.

These tests were carried out using the homopolymer coagulant and copolymer flocculent as described in Example 1. The coagulant polymer was added at increasing doses on an active basis followed by the flocculant copolymer at a constant dose of 100 ppm. Mixing was achieved by placing sludge in a beaker and stirring with an Heidolph stirrer for 7 seconds following addition of the coagulant polymer and 8 seconds following addition of the flocculant polymer. The sludge was then filtered through the mesh and the drainage volume after 10 secs. noted. The charge and turbidity were then measured on the filtrate so produced.

| Low MW Polymer Dose (ppm) | Filtrate Charge (Meq/l) | Drainage (ml) | Turbidity (NTU) | Cake Solids (%) |
| --- | --- | --- | --- | --- |
| 90 | −3.000 | 71 | 20 | 16.05 |
| 120 | −0.152 | 129 | 13 | 16.08 |
| 150 | 0.117 | 131 | 11 | 15.90 |
| 180 | 0.491 | 130 | 14 | 17.09 |
| 210 | 0.598 | 128 | 18 | 17.86 |
| 240 | 1.160 | 114 | 18 | 17.67 |

These results indicate that there is good correlation between charge, turbidity and drainage volume. In this particular process the highest cake solids are obtained at a charge of 0.598 meq/l whilst the charge which gives optimum turbidity and drainage is 0.117 meq/l. Accordingly the process could be controlled for optimum clarity or for optimum drainage by maintaining the charge at around 0.1 meq/l or could be controlled for optimum cake solids by maintaining the charge at above around 0.55 meq/l, for instance 0.55 to 1 meq/l. Alternatively, a turbidity value of 18NTU and/or a drainage value of 128NTU could be utilised to control the process so as to give optimum cake solids, particularly if conditions are selected such that the filtrate charge is positive rather than negative.

In all these processes, charge conveniently is measured utilising a particle charge detector, for instance a Mutek PCD 02 or a Mutek Particle Charge Titrator such as PCT 10.

In any of the commercial processes shown in Examples 4 to 8, the process may be conducted continuously with the separated liquor being recycled to an earlier stage in the process.

We claim:

1. A process of dewatering feed suspension comprising
    flocculating a feed suspension having a variable ionic charge by dosing into the suspension a coagulant and then dosing into the suspension a water soluble polymeric flocculant having IV at least 4 dl/g, wherein the coagulant is selected from a water soluble salt of a polyvalent metal and a water soluble polymer having an intrinsic viscosity below 3 dl/g and an ionic charge of at least 3 meq/g, said coagulant having an ionic charge higher than the ionic charge of said flocculant, and
    dewatering the flocculated suspension to form a thickened sludge or cake and separated liquor, and in which
    the flocculant is added at a substantially constant predetermined dosage, and
    the value is monitored of a dewatering parameter of the separated liquor or the suspension after flocculation and which varies in response to variation in ionic charge of the feed suspension, and
    the coagulant is added at a dosage selected in response to variations in the dewatering parameter and therefore an ionic charge of the feed suspensions in order to maintain the monitored value substantially at a preselected optimum value.

2. A process according to claim 1 in which the dewatering parameter value which is monitored is a dewatering parameter value of the separated liquor.

3. A process according to claim 2 in which the dewatering parameter value which is monitored is the charge in the separated liquor.

4. A process according to claim 1 in which the feed suspension is sewage sludge.

5. A process according to claim 1 in which the suspension is mechanically dewatered.

6. A process according to claim 5 in which the suspension is dewatered by centrifugation, belt press or filter press to form a cake.

7. A process according to claim 1 in which the flocculant is a polymer having IV at least 6 dl/g and formed from 2.5 to 65 mole % ionic ethylenically unsaturated monomer and 97.5 to 35 mole % non-ionic ethylenically unsaturated monomer.

8. A process according to claim 1 in which the coagulant which is added in response to the monitored parameter value is a polymeric coagulant selected from polyethylene imine, polyamine, epichlorohydrin diamine condensation product, dicyandiamide polymer, and polymers of 70 to 100 mole % ionic ethylenically unsaturated monomer and 0 to 30 mole % ethylenically unsaturated non-ionic monomer and has IV below 3 dl/g.

9. A process according to claim 1 in which the flocculant is a cationic polymer having IV at least 6 dl/g and the coagulant is a cationic polymer having a charge density at least 1.5 times the charge density of the flocculant.

10. A process according to claim 1, in which the dewatering parameter is the filterability of the suspension, the turbidity of the separated liquor the conductivity of the suspension or the separated liquor, or the charge of the suspension or the separated liquor.

11. A process according to claim 1, in which the flocculant polymer has an anionic charge of 0.1 to 2 meq/g.

12. A process for dewatering a feed sewage sludge having variable ionic charge during a period of time comprising flocculating the sludge by dosing into the sludge a water soluble cationic polymeric coagulant having IV below 3 dl/g and then dosing into the sludge a water soluble cationic polymeric flocculant having IV at least 4 dl/g and having a lower cationic charge density than the coagulant, and dewatering the flocculated sludge by a centrifuge, filter press or belt press to form a cake and separated liquor, and in which the flocculant is added at a predetermined substantially constant dosage over said period, ionic charge of the sludge varies during this period, the ionic charge on the separated liquor is monitored during this period, and the coagulant is added at a dosage selected in response to the monitored charge value in order to maintain the monitored charge value substantially at a preselected optimum throughout the period.

13. A process of dewatering feed suspension comprising
    flocculating a paper mill sludge feed suspension having a variable ionic charge by dosing into the suspension a coagulant, and then dosing into the suspension a water soluble cationic polymeric flocculant having IV at least 4 dl/g, wherein the coagulant is selected from a water soluble salt of a polyvalent metal and a water soluble polymer having an intrinsic viscosity below 3 dl/g and an ionic charge of at least 3 meq/g, said coagulant having an ionic charge higher than the ionic charge of said flocculant, and dewatering the flocculated suspension to form a thickened sludge or cake and separated liquor, and in which the flocculant is added at a substantially constant predetermined dosage, the value is monitored of a dewatering parameter of the separated liquor or the suspension after flocculation and which varies in response to variation in ionic charge of the feed suspension, and the coagulant is added at a dosage selected in response to variations in the dewatering parameter and therefore an ionic charge of the feed suspensions in order to maintain the monitored value substantially at a preselected optimum value.

14. A process according to claim 13, in which dewatering parameter is the filterability of the suspension, the turbidity of the separated liquor the conductivity of the suspension or the separated liquor, or the charge of the suspension or the separated liquor.

* * * * *